(12) United States Patent
Kojima

(10) Patent No.: US 7,810,535 B2
(45) Date of Patent: Oct. 12, 2010

(54) PNEUMATIC RADIAL TIRE

(75) Inventor: Hiroyuki Kojima, Hiratsuka (JP)

(73) Assignee: The Yokohama Rubber Co., Ltd., Tokyo (JP)

(*) Notice: Subject to any disclaimer, the term of this patent is extended or adjusted under 35 U.S.C. 154(b) by 11 days.

(21) Appl. No.: 12/296,052

(22) PCT Filed: Oct. 4, 2007

(86) PCT No.: PCT/JP2007/069434
§ 371 (c)(1),
(2), (4) Date: Oct. 3, 2008

(87) PCT Pub. No.: WO2008/062608
PCT Pub. Date: May 29, 2008

(65) Prior Publication Data
US 2009/0095391 A1    Apr. 16, 2009

(30) Foreign Application Priority Data
Nov. 24, 2006    (JP) .............................. 2006-317191

(51) Int. Cl.
B60C 9/00    (2006.01)
B60C 15/00   (2006.01)
B60C 15/06   (2006.01)

(52) U.S. Cl. ........................ 152/539; 152/542; 152/546; 152/548; 152/555

(58) Field of Classification Search ........................ None
See application file for complete search history.

(56) References Cited

U.S. PATENT DOCUMENTS

| | | | | |
|---|---|---|---|---|
| 4,635,694 A | * | 1/1987 | Hosokawa | 152/209.9 |
| 4,702,293 A | * | 10/1987 | Iwata et al. | 152/531 |
| 5,958,163 A | * | 9/1999 | Kojima | 152/542 |
| 6,257,290 B1 | * | 7/2001 | Sakamoto et al. | 152/209.16 |
| 6,296,030 B1 | * | 10/2001 | Fishman | 152/454 |
| 7,506,676 B2 | * | 3/2009 | Ebiko | 152/209.18 |

FOREIGN PATENT DOCUMENTS

| | | |
|---|---|---|
| JP | A 3-104707 | 5/1991 |
| JP | A 4-215502 | 8/1992 |
| JP | A 11-245626 | 9/1999 |
| JP | 2000-198325 * | 7/2000 |
| JP | A 2001-163009 | 6/2001 |
| JP | A 2002-127712 | 5/2002 |
| JP | A 2004-42755 | 2/2004 |
| JP | A 2004-352174 | 12/2004 |
| JP | 2006-35955 * | 2/2006 |
| JP | A 2006-130942 | 5/2006 |
| JP | A 2006-290169 | 10/2006 |

OTHER PUBLICATIONS

Machine translation of JP 2000-198325, 2000.*

* cited by examiner

*Primary Examiner*—Justin Fischer
(74) *Attorney, Agent, or Firm*—Greer, Burns & Crain, Ltd.

(57) ABSTRACT

Provided is an ultra-low profile pneumatic radial tire for SUV or the like having an aspect ration of 55% or less and a tire outer diameter of 720 mm or more, which has improved load durability while managing a weight reduction without deteriorating driveability. A carcass layer (4) thereof is configured as a single ply, and both ends thereof are folded back around left and right bead cores (7) so as to wrap bead fillers (8). A folded-back portion (4t) is wrapped on the inner side of an end of a belt layer (5) in a range not greater than 10% of the maximum width of the belt layer (5). The hardness of the bead fillers is 65 to 80 in terms of JIS durometer A hardness, and a height hb of the bead fillers (8) from a bead base is brought to 10 to 20% of the height H of a tire cross-section.

11 Claims, 2 Drawing Sheets

PNEUMATIC RADIAL TIRE

This application is a U.S. National Phase under 35 U.S.C. §371 of International Application No. PCT/JP2007/069434, filed Oct. 4, 2007.

TECHNICAL FIELD

The present invention relates to a pneumatic radial tire. More specifically, the present invention relates to an ultra-low profile pneumatic radial tire for SUV or the like having been improved in load durability while reduced in weight without deteriorating driveability.

BACKGROUND ART

Recently, SUV (Sport Utility Vehicle) has drawn attention as multipurpose passenger vehicle. SUV has features such as a large body securing a large interior space for achieving both sportiveness and practicability, and a high output engine mounted thereon for securing high maneuverability and high running performance. As a pneumatic radial tire for such SUV, used is an ultra-low profile pneumatic radial tire having a large tire outer diameter for achieving a high driving force, and also having an aspect ratio of 55% or less for achieving a high driveability.

As a tire for SUV with such features, Patent Document 1 discloses a tire having an aspect ratio of 55% or less and a large tire outer diameter of 750 to 820 mm, as well as having a two-ply structure including a high turned-up ply and a semi turned-up ply as carcass layers. The high turned-up ply is formed so as to extend each of both end portions of a carcass layer folded back around bead cores to the inner side of the ends of a belt layer. The semi turned-up ply is formed so as to extend each of both end portions of other carcass layer to a region between an end of the belt layer and a portion of the tire maximum width.

However, consider the case where a tire with an increased tire outer diameter as described above is provided with the two-ply carcass structure including the high turned-up ply having a folded length extending to both end portions of the belt layer and the semi turned-up ply having a folded length extending beyond the portion of the tire maximum width. The tire increases the weight significantly, so that the fuel consumption is inevitably increased. Accordingly, it is necessary to reduce the weight of the tire in order to suppress such increase in fuel consumption.

However, consider a single ply structure composed of only the high turned-up ply which is formed by omitting the semi turned-up ply from the above two-ply carcass structure in order to reduce the weight of the tire. In this case, if the tire has a large structure having an aspect ratio of 55% or less and a tire outer diameter of 720 mm or more, a share of a load to the carcass layer becomes too large. Accordingly, the load durability of the tire is deteriorated. Particularly, a stress is concentrated on the carcass layer in a vicinity of an outer end of the bead filler in the tire radial direction, thus bringing about a problem that the carcass layer is likely broken.

[Paten Document 1] Japanese patent application *Kokai* Publication No. 2004-352174

DISCLOSURE OF THE INVENTION

Problems to be Solved by the Invention

An object of the present invention is to provide a pneumatic radial tire which has been improved in the load durability while managing a weight reduction without deteriorating the driveability, the tire being a large ultra-low profile pneumatic radial tire used for an SUV or the like.

Means for Solving the Problems

To achieve the above-described object, a pneumatic radial tire of the present invention is configured so that a carcass layer is disposed inside the tire to extend from a tread portion to left and right bead portions through side wall portions, and a plurality of piles of belt layer are disposed on the outer circumferential side of the carcass layer, and the pneumatic radial tire is a large type that has the aspect ratio of 55% or less and outer diameter of 720 mm or more. For such a large type of a pneumatic radial tire, the carcass layer is formed as a single ply, and both ends of the carcass layer of the single ply are folded back from the inner side to the outer side around left and right bead cores, respectively, so as to wrap bead fillers; the end of the folded-back portion are wrapped on the inner side of the ends of the belt layer in a range not greater than 10% of the maximum width of the belt layer. The hardness of the bead fillers is 65 to 80 in terms of JIS durometer A hardness, and a height hb of the bead fillers (8) from a bead base is 10 to 20% of a height H of a tire cross-section.

In the above-described tire configuration, it is preferable that a tire outer diameter is from 720 mm to 765 mm. Further, it is preferable for the carcass layer to use a cord composed of three rayon fibers of fineness 1840 to 2200 dtex to be twisted. Further, it is preferable that a reinforcement layer formed of an organic fiber cord is disposed between the main body of the carcass layer and a folded-back portion so as to extend in the tire radial direction along a bead core and a bead filler, and a height hr of this reinforcement layer in the tire radial direction is 40 to 60% of the height H of a tire cross-section.

It is preferable that at least one ply of a full cover layer is disposed on the outer side of the belt layer as a belt cover layer, the full cover layer being formed of organic fiber cord winded continuously and helically over the entire width of the belt layers in the tire circumferential direction. Further, for the full cover layer, it is preferable to use a reinforcement cord composed of two bundles of organic fibers of 940 dtex or more and also less than 1000 dtex to be twisted, and to configure a cord in a high density of 60 to 80 bundles per 50 mm.

Further, an edge cover can be disposed as a belt cover layer, the edge cover being winded continuously and helically in the circumferential direction of a tire on regions of both ends of the belt layers at smaller pitches than those of the above described full cover layer. This edge cover layer may be disposed on the outer circumferential side of the full cover layer or on the inner circumferential side thereof. The reinforcement cord for the edge cover is configured by a cord two organic fibers of 940 dtex or more and also less than 1000 dtex to be twisted, as same as the cord of the full cover layer. It is preferable that the edge cover layer is disposed on a region which occupies by ±5 mm from an intersection, as a center, at which a line extending from the end of the folded-back portion of the above described carcass layer in the normal direction of the carcass layer intersects a surface of the belt layer.

As a tread pattern of a tread surface, it is preferable to have a configuration that a plurality of main grooves extending in the tire circumferential direction are disposed in parallel on a center portion, and also a plurality of lug grooves extending in the width direction are disposed on the left and right shoulder portions at a pitch in the tire circumferential direction. In addition, it is preferable for this tread pattern that a ratio of a groove area occupied by all grooves on the tread surface is 28 to 33%, and also a ratio of a groove area occupied only by the main grooves is 23 to 28%. Further, it is preferable that the tread pattern is asymmetric on the left and right sides with respect to the tire equator line, and also a lug groove provided to the shoulder portion on the outer side of a vehicle does not communicate with a main groove with a land portion interposed therebetween. Still further, it is preferable that the depth of the main groove is from 8.5 mm to 9.5 mm and the depth of the lug groove is from 30% to 50% of the depth of the main groove.

Effect of the Invention

According to this invention, in a large pneumatic radial tire having an aspect ratio of 55% or less and an outer diameter of 720 mm or more, the weight of the tire can be reduced by forming a carcass layer as a single ply structure. Even though the carcass layer is formed as a single ply structure, a side rigidity is increased by reducing the height of the side portions by setting the aspect ratio to 55% or less, and further by wrapping folded-back portions of the carcass layer into the inner side of ends of the belt layer. Thus, high driveability can be maintained. Further, even though the carcass layer is formed as a single ply layer, the hardness of a bead filler is relatively low in the range of 65 to 80 in terms of JIS durometer A hardness, and a height of the bead filler from a bead base is set small so as to be 10 to 20% of the cross-sectional height of the tire, so that a stress concentration on the carcass layer in a region of the end of the bead filler can be relaxed, and the load durability of the tire is improved.

DESCRIPTION OF SYMBOLS

Figure 1:
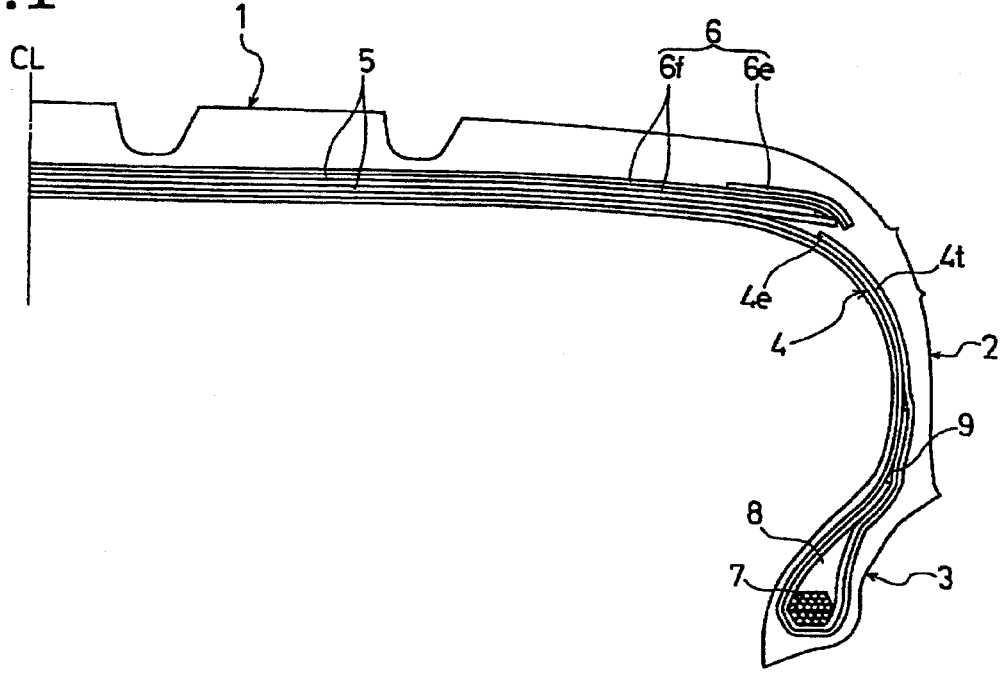
FIG. 1 is a half-cross-sectional view of a pneumatic radial tire showing an embodiment of the present invention.

1 tread portion
2 sidewall portion
3 bead portion
4 carcass layer
4t folded-back portion
4e end (of the folded-back portion)
5 belt layer
6 belt cover layer
6f full cover layer
6e edge cover layer
7 bead core
8 bead filler
9 reinforcement layer
10 main groove
11, 11', 15, 15', 16, 17 lug groove

BEST MODES FOR CARRYING OUT THE INVENTION

A pneumatic radial tire of this invention is configured so that the aspect ratio is 55% or less and the outer diameter is 720 mm or more. It is preferable that the aspect ratio is from 30 to 55%, and more preferably that the tire is an ultra-low profile type having aspect ratio from 35 to 50%. It is preferable that the tire outer diameter is 720 mm or more but 765 mm or less, and more preferably that the tire outer diameter is 720 mm or more but 750 mm or less. When the tire outer diameter exceeds 765 mm, it becomes difficult to maintain the load durability of a tire.

The carcass layer is formed as a single ply structure. By forming the carcass layer as a single ply structure, a weight of a tire is reduced. Both ends of the carcass layer formed as a single ply structure as described above are folded back around bead cores from the inner side of the tire to the outer side thereof; further, the both ends are turned up so as to wrap bead fillers and wrapped on the inner side of ends of the belt layer. In connection with this single ply structure of the carcass layer, the hardness of a bead filler disposed on an outer circumference of a bead core is brought in the range of 65 to 80 in terms of JIS durometer A hardness, which is relatively low compared to that of a usual bead filler. In addition, for this bead filler having low hardness, the height hb of the bead filler from a bead base is 10 to 20% of the cross-sectional height H of the tire, and this height is also relatively low compared to that of a usual bead filler.

For the carcass layer having the above described single ply structure, the end of the folded-back portion around the bead core is extended as far as it is wrapped on the inner side of the belt layer, and a wrapping length L on the end of the belt layer is set to 10% or less of the maximum width of the belt layer. It is preferable that a lower limit of the wrapping length L is at least 1 mm. The reason for setting the wrapping length L to 10% or less of the maximum width of the belt layer is that even if the length is made larger than 10% of the maximum width of the belt layer, the almost no improvement in driveability is achieved, and increase in weight is induced.

In this invention, the tire outer diameter represents a maximum outer diameter in the case where a tire is mounted on a normal rim in accordance with the JATMA standard and where the tire is pumped up to a normal inner pressure and put under no loading condition. JIS durometer A hardness represents the hardness of rubber of type A defined in JIS K6253. The wrapping length L of the end of the folded-back portion of the carcass layer represents a length defined by one between the end of the folded-back portion of the carcass layer and an intersection b at which a line extending from an end of the belt layer on the maximum width thereof in the normal direction of the carcass layer intersects a surface of the carcass layer (refer to FIG. 2).

The tire of this invention is configured to have the tire outer diameter less than 720 mm and the carcass layer having a single ply structure. But the aspect ratio is set to not more than 55%, thus the height of the side portions is extremely small. And also, both ends of the carcass layer are bead cores and folded back so as to wrap bead fillers and the both ends are wrapped on the inner side of ends of the belt layer. Therefore, side rigidity increases due to a synergic effect produced by the side portions having an extremely small height and a folding-back structure of the carcass layer, thus driveability can be maintained high.

Further, even when the carcass layer has a single ply structure, the hardness of a bead filler is relatively low in the range of 65 to 80 in terms JIS durometer A hardness, and the height hb from a bead base is relatively small, that is, 10 to 20% of the cross-sectional height H of the tire. Thus, a stress concentration on the carcass layer in a region of the end of the bead filler is relaxed and a break of the carcass layer is less likely to occur. Thus, the load durability of the tire can be improved. When the hardness of a bead filler is higher than 80 in terms JIS durometer A hardness or when the height hb exceeds 20% of the cross-sectional height H of the tire, load durability is deteriorated. And when the hardness of a bead filler is lower than 65 in terms of JIS durometer A hardness or when the height hb is less than 10% of the cross-sectional height H of the tire, driveability is deteriorated.

In this invention, for a fiber cord composing the carcass layer, rayon fibers, nylon fibers, polyester fibers, and the like are used, and there is no particular limitation on type. Still, it is preferable to use a cord that three rayon fibers of fineness 1840 to 2200 dtex are twisted together. A rayon fiber has a higher modulus of elasticity compared with a nylon fiber, a polyester fiber or the like, so it is advantageous in the improvement of load durability and driveability.

Further, it is preferable for the tire of this invention to insert a reinforcement layer formed of an organic fiber cord between the main body of the carcass layer and a folded-back portion to extend in the tire radial direction along the bead core and the bead filler. In addition, a height hr of the reinforcement layer in the tire radius direction is preferably 40 to 60% of the cross-sectional height of the tire. By setting the height hr of the reinforcement layer in the tire radius direction to 40% or more of the cross-sectional height of the tire, the side rigidity of the side wall is increased. Thus driveability can further be improved. By bringing the height hr of the reinforcement layer in the tire radius direction to 60% or less of the cross-sectional height of the tire, a stress concentration on the carcass layer in the vicinity of an upper end of the reinforcement layer is relaxed, so that load durability can be improved.

The reinforcement layer for the bead core and the bead filler may be disposed on either the outer or inner side of a tire, or may be disposed on both the outer and inner sides of the tire. In particular, as in the embodiments shown in FIGS. 1 and 2, it is preferable that the reinforcement layer is wrapped around the bead core and the bead filler so as to range from the inner side to the outer side of the tire.

An organic fiber cord composing the reinforcement layer is to be disposed in bias to the tire radial direction, and the angle to the tire radial direction is preferably from 20 to 70 degrees. Further, while there is no limitation on the type of the organic fiber cord, a fiber having a high modulus of elasticity such as an aramid fiber, a polyketone fiber and the like is preferably used.

On the outer circumference of the belt layer of the tread portion, a belt cover layer is preferably disposed. Specifically, for the belt cover layer, a cord composed of two organic fibers of fineness of not less than 940 dtex but less than 1000 dtex being twisted is used for a full cover layer which is formed by winding this cord continuously and helically over the entire width of the belt layers in a high density of 60 to 80 cords/50 mm in the tire circumferential direction. By disposing the full cover layer, driveability can further be improved. It may be sufficient for the full cover layer to provide one ply, but it is preferable to provide two plies. Together with the high density of cords set for the full cover layer, by forming the full cover layer into two plies, driveability can be even further improved. For a cord used for the belt cover layer, a fiber having a high modulus of elasticity such as a nylon fiber, an aramid fiber, a polyketone fiber and the like is preferably used.

For the belt cover layer, besides the full cover layer, edge covers restraining both end regions of the belt layer may be provided, by which further the durability of the belt layer is improved. For a reinforcement cord for the edge cover layer, a cord of two organic fibers of fineness of not less than 940 dtex but less than 1000 dtex being twisted is preferably used, which is the same as that used for the full cover layer. Further, it is preferable that, the cord of the edge cover layer is winded continuously and helically at a smaller pitch than that of the full cover layer. As shown in the embodiments shown in FIGS. 1 and 2, the edge cover layer may be disposed on the outer side of both ends of the full cover layer, or may be disposed between the full cover layer and the belt layer so as to cover the ends of the belt layer directly.

A region winded by the edge cover occupies a range extending by at least ±5 mm from an intersection p, as the center, on each one of both sides in the width direction, at which a line A, extending from the end of the folded-back portion of the above carcass layer in the normal direction of the carcass layer, intersects a surface of the belt layer, preferably. Providing the edge cover in this manner can prevent a separation defect of the ends of belt layers generated at the end of the folded-back portions of the carcass layer.

Figure 2:
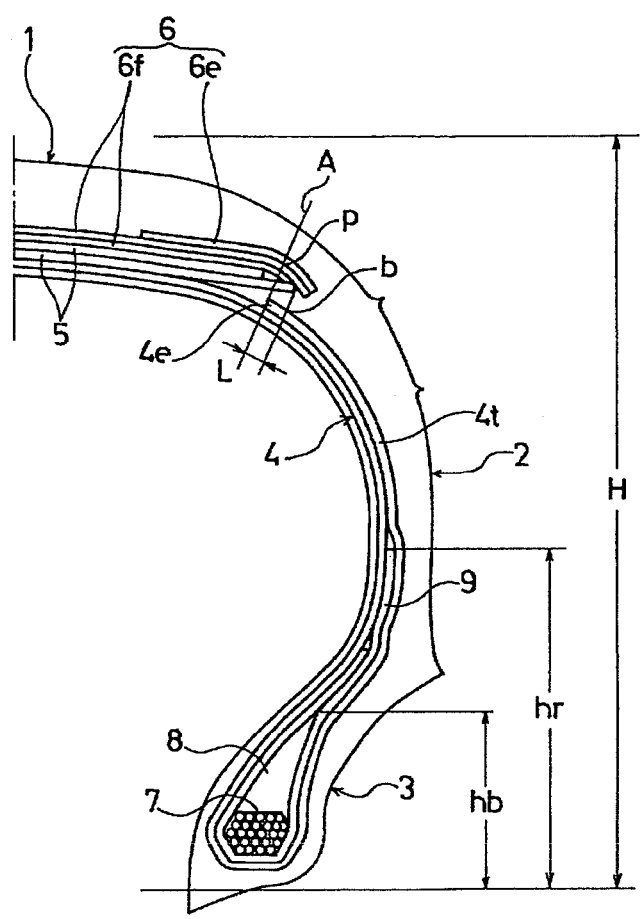
FIG. 2 is an enlarged sectional view of a main portion of the tire of FIG. 1.

FIGS. 1 and 2 exemplify the embodiments of this invention of an ultra-low profile pneumatic radial tire, which is for SUV, and has an aspect ratio of 55% or less and a tire outer diameter of 720 mm or more. FIG. 1 is a half-cross-sectional view showing one side of the tire with respect to a center line CL of the tire equator line. FIG. 2 is a enlarged sectional view of the main portion of the tire.

In the pneumatic radial tire of FIGS. 1 and 2, reference numeral 1 denotes a tread portion, 2 a sidewall portion, and 3 a bead portion, and inside these portions, a carcass layer 4 of a single ply is disposed; on the outer circumferential side of the carcass layer 4, a belt layer 5 of two plies is disposed. Further, on the outer side of the belt layer 5, a belt cover layer 6 formed by winding an organic fiber cord continuously and helically in the tire circumferential direction is disposed. The belt cover layer 6 is configured by providing a full cover layer 6f and an edge cover layer 6e. The full cover layer 6f is of two plies and covers the entire width of the belt layer 5. The edge cover is of single ply and covers only an end region of the belt layer 5.

The carcass layer 4 of a single ply structure is folded back on both ends thereof around the bead core 7 from the inner side of the tire to the outer side thereof. A folded-back portion 4t is folded back so as to wrap the bead filler 8, and an end 4e is wrapped on the inner side of an end of the belt layer 5. A hardness of bead filler 8 is relatively low compared with conventional tires, and the hardness thereof is 65 to 80 in terms of JIS durometer A hardness. In addition, a height hb from a bead base is relatively small, that is, 10 to 20% of the cross-sectional height H of the tire.

In the inner side of the folded-back portion 4t of the carcass layer 4, a reinforcement layer 9 formed of organic fiber cords is inserted. The reinforcement layer 9 is winded so as to wrap the bead core 7 and the bead filler 8, and extended to the vicinity of the maximum width of the tire along the outer faces of the bead core 7 and the bead filler 8. The height hr from a bead base to an extended end of the reinforcement layer 9 is preferably 40 to 60% of the cross-sectional height H of the tire.

In addition to the above-described tire structure, by configuring the tread pattern of the tire of this invention in accordance with the following description, driveability can further be improved.

The tread pattern of the tread surface is formed so that a plurality of main grooves extending in the tire circumferential direction are disposed in parallel on a center portion of the tread surface, and on both the left and right shoulder portions, a plurality of lug grooves extending in the tire width direction are arranged at a pitch. On this tread pattern, a ratio of a groove area occupied by all grooves on the tread surface is set to 28 to 33%, and a ratio of a groove area occupied only by the main grooves is set to 23 to 28%. By setting the ratio of the groove area occupied by all grooves to 28% or more, favorable driveability can be obtained on a wet road surface, while by setting the ratio thereof to 33% or less, favorable driveability can also be obtained on a dry road surface. Further, by setting the ratio of the groove area occupied only by the main grooves to 23% or more, favorable driveability can be obtained on a wet road surface, while by setting the ratio thereof to 28% or less, favorable driveability can also be obtained on a dry road surface. In particular, when the tread pattern is designed so that the ratio of the groove area on all grooves and the ratio of the groove area on the main grooves are in the ranges as described above, and the tread pattern is asymmetric on the left and right sides with respect to the tire equator line, the driveability can be further improved by providing a lug groove to the shoulder portion on the outer side of a vehicle which dose not communicate with a main groove with a land portion interposed therebetween.

Further, when the tread pattern is formed so that a plurality of main grooves extending in the tire circumferential direction are disposed in parallel on the center portion, and the plurality of lug grooves extending in the tire width direction are arranged at the pitch on both the left and right shoulder portions, cornering power is increased by setting the depth of the main groove to 8.5 mm to 9.5 mm and the depth of the lug groove to 30% to 50% of the depth of the main groove, thus driveability can further be improved.

In any one of the above mentioned tread patterns, on the groove widths of the main grooves and the lug grooves, the width of the main grooves is in the range of 5 to 20 mm, and the lug grooves have preferably the same groove width as the major grooves, or more preferably a width smaller than the main groove which is in the range of 1.5 to 1.6 mm.

Figure 3:
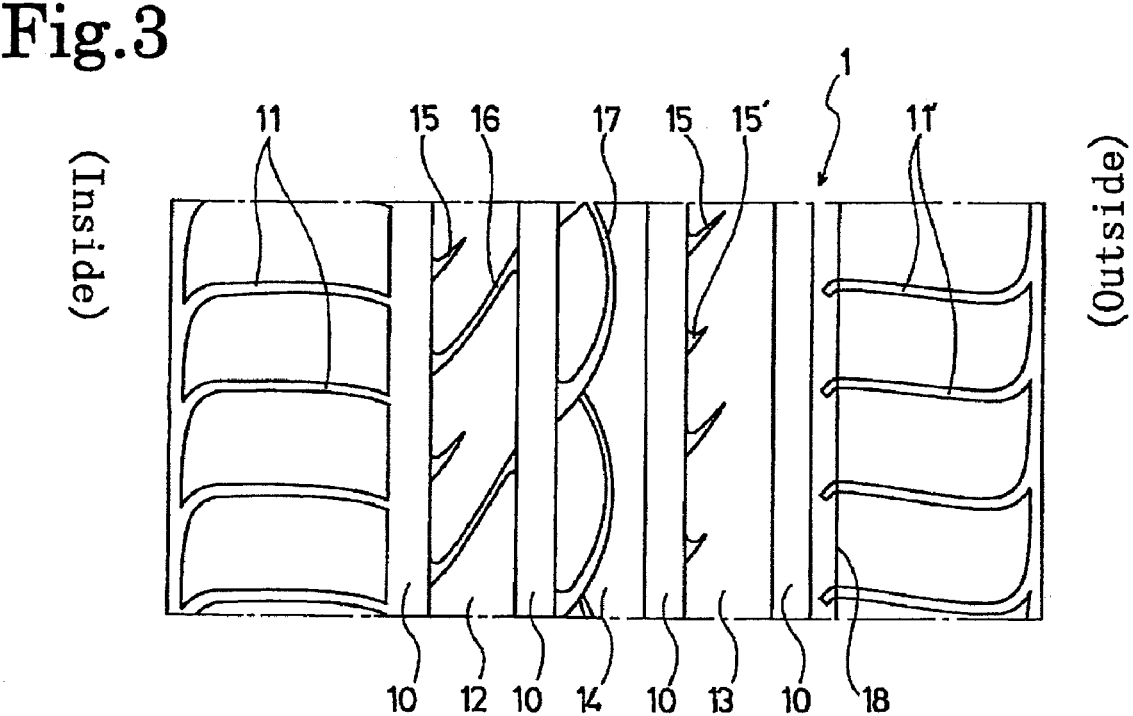
FIG. 3 is a plan view of a tread pattern to be used for the pneumatic radial tire according to the embodiment of this invention.

FIG. 3 exemplifies a tread pattern provided to the pneumatic radial tire of this invention, which is an ultra-low profile tire for SUV and has an aspect ratio of 55% or less.

The tread pattern is formed to be asymmetric with respect to the tire equator line, and the left side in the drawing corresponds to the inner side of the vehicle, and the right side corresponds to the outer side thereof. To a center portion of the tread portion 1, four grooves 10 are provided parallel in straight line in the tire circumferential direction. And to the left and right shoulder portions, a plurality of lug grooves 11, 11' are respectively provided in the tire circumferential direction at a pitch. Of the lug grooves 11, 11' provided to the left and right shoulder portions, the lug grooves 11 provided to the shoulder portion on the inner side of the vehicle communicate with the main groove 10. However, the lug grooves 11' provided to the shoulder portion on the outer side of the vehicle does not communicate with the adjacent main groove 10 with a land portion interposed therebetween. With the lug grooves 11' arranged at the pitch, a fine groove 18 communicates in the tire circumferential direction.

The four main grooves 10 provided to the center portion of the tread portion 1 forms three lines of land portions, and of those, on a land portion 12 on the left hand (the inner side of the vehicle) line on the drawing, a lug groove 15 and lug groove 16 are provided. The lug groove 16 runs through the land portion 12 in an oblique direction. The lug groove 15 is opened only to the main groove 10 positioned to the inner side. The lug grooves 15 and 16 are alternately provided in the tire circumferential direction. In contrast, on a land portion 13 on the right hand (the outer side of the vehicle) line of the drawing, a long lug groove 15 and a short lug groove 15', both being open to the main groove 10 positioned to the inner side, are alternately provided in the tire circumferential direction. Further, on a central land portion 14, a plurality of arc-like lug grooves 17 being only open to the main groove 10 positioned to the inner side are provided in the tire circumferential direction and are connected to each other.

For the above described tread pattern, the ratio of the groove area on all grooves is set to 28 to 33% and at the same time, the ratio of the groove area only on the main grooves is set to 23 to 28%, so that wet driveability and dry driveability can be achieved in a harmonious manner. Further, the lug groove 11' provided to the shoulder portion on the outer side of the vehicle is caused not to be communicated with the adjacent main groove 10, whereby cornering power to an outer direction of the tire is increased, thus improving driveability. In addition, the lug grooves 15 and 17 of the land portion formed on the center portion are caused to be open only to the adjacent major lug 10 positioned to the inner side of the vehicle, thus further improving the driveability.

The pneumatic radial tire of this invention is effective as a tire for SUV, but is also applicable to cars other than SUV, such as passenger cars, four-wheel-drive cars and light vans.

EXAMPLES

Examples 1 to 3, Comparative Examples 1 to 3, and Conventional Example 1

Seven types of pneumatic radial tires (Examples 1 to 3, Comparative Examples 1 to 3, and Conventional Example 1 corresponding to Patent Document 1) have been fabricated. Each of the tires have common configuration of tire size of 295/35R21 and a rayon cord used for each carcass layer. Tire outer diameters, structures of carcass layers, bead filler structures (JIS durometer A hardness and ratio of height hb to cross-sectional height of the tire), and reinforcement layers (type of cord and ratio of height hr to cross-sectional height of the tire) of each tire are varied as described in Table 1.

Incidentally, in Table 1, FULL-TURNED UP PLY of CARCASS LAYER refers to a ply whose folded-back portion is wrapped into the inner side of an end of a belt layer, and WRAPPING LENGTH L represents a ratio of the wrapped folded-back portion to the maximum belt width. SEMI-TURNED-UP PLY refers to a ply whose folded-back portion is extended to a middle range between an end of the belt layer and the maximum tire width.

On the seven types of tires fabricated in the above-described manner, the weight of tires, driveability, and load durability have been measured in accordance with the following test method, and results described in Table 1 have been obtained.

(Weight of Tire)

The tire weights were measured using a scale, and an evaluation result is represented by an index number where the tire weight of Conventional Example 1 has been set to 100. The smaller the index number is, the smaller the tire weight is.

(Driveability)

The Test Tires were Mounted on Rims Each Having a Size of 21×10J, and these tires were mounted on a 4.5 litter four-wheel-drive car as the front wheels and the rear wheels. The air pressures were each set to 260 kPa for the front wheels and 290 kPa for the rear wheels. Driveability of the car was evaluated by test drivers driving a 4 km test course by using a five point system.

An evaluation value is represented by an index number where the evaluation value of Conventional Example 1 has been set to 100. The larger the index number is, the more superior the driveability is.

(Load Durability)

The test tires were mounted on a rim having a size of 21×10J, with the air pressure being 120 kPa. By using a test drum machine having a diameter of 1.7 m, the tires were subjected to a load of 9.6 kN and run at a speed of 80 km/h. A travel distance before the tire breaks were measured.

An evaluation value is represented by an index number where the evaluation value of Conventional Example 1 has been set to 100. The larger the index number is, the more superior the load durability is.

TABLE 1

|  | CONVENTIONAL EXAMPLE 1 | COMPARATIVE EXAMPLE 1 | COMPARATIVE EXAMPLE 2 | COMPARATIVE EXAMPLE 3 | EXAMPLE 1 | EXAMPLE 2 | EXAMPLE 3 |
|---|---|---|---|---|---|---|---|
| Aspect ratio (%) | 35 | 35 | 35 | 35 | 35 | 35 | 35 |
| Tire outer diameter (mm) | 750 | 750 | 735 | 735 | 735 | 735 | 735 |
| Carcass layer: | | | | | | | |
| Full-turned up ply (wrapping length L(%)) | Present (5) | Present (5) | Pesent (5) | Present (5) | Present (5) | Present (5) | Present (5) |
| Semi-turned up ply (height h/H (%)) | Present (65) | None (—) | None (—) | None (—) | None (—) | None (—) | None (—) |
| Bead filler: | | | | | | | |
| Hardness (JIS TYPE A) | 90 | 90 | 90 | 60 | 75 | 80 | 65 |
| Height hb/H (%) | 40 | 40 | 40 | 40 | 15 | 10 | 20 |
| Reinforcement layer: | | | | | | | |
| Types of Reinforcement Cords | Steel | Ararmid | Aramid | Aramid | Aramid | Aramid | Aramid |
| Height hr/H (%) | 45 | 45 | 45 | 45 | 45 | 45 | 45 |
| Weight of tire (Index number) | 100 | 95 | 93 | 93 | 85 | 82 | 87 |
| Load durability (Index number) | 100 | 90 | 90 | 95 | 110 | 100 | 105 |
| Driveability (Index number) | 100 | 105 | 105 | 102 | 105 | 108 | 105 |

Examples 4 to 6, Comparative Examples 4 to 6, and Conventional Example 2

Seven types of pneumatic radial tires (Examples 4 to 6, Comparative Examples 4 to 6, and Conventional Example 2 corresponding Patent Document 1) have been fabricated. Each of the tires have common configuration of tire size of 275/45R20 and a rayon cord used for each carcass layer. Tire outer diameters, structures of carcass layers, bead filler structures (JIS durometer A hardness and ratio of height hb to cross-sectional height of the tire), and reinforcement layers (type of cord and ratio of height hr to cross-sectional height of the tire) of each tires are varied as described in Table 2.

On the seven types of tires fabricated in the above-described manner, The same test method having the same measuring methods were used, except for the rim size, which was set to 20×9J. The weight of tires, driveability, and load durability have been measured, and results described in Table 2 have been obtained.

TABLE 2

|  | CONVENTIONAL EXAMPLE 2 | COMPARATIVE EXAMPLE 4 | COMPARATIVE EXAMPLE 5 | COMPARATIVE EXAMPLE 6 | EXAMPLE 4 | EXAMPLE 5 | EXAMPLE 6 |
|---|---|---|---|---|---|---|---|
| Aspect ratio (%) | 45 | 45 | 45 | 45 | 45 | 45 | 45 |
| Tire outer diameter (mm) | 770 | 770 | 760 | 760 | 760 | 760 | 760 |
| Carcass layer: | | | | | | | |
| Full-turned up ply (wrapping length L(%)) | Present (5) | Present (5) | Present (5) | Present (5) | Present (5) | Present (5) | Present (5) |
| Semi-turned up ply (Height h/H (%)) | Present (65) | None (—) | None (—) | None (—) | None (—) | None (—) | None (—) |
| Bead filler: | | | | | | | |
| Hardness (JIS TYPE A) | 90 | 90 | 90 | 60 | 75 | 80 | 65 |
| Height hb/H (%) | 45 | 45 | 45 | 45 | 20 | 15 | 20 |
| Reinforcement layer: | | | | | | | |
| Types of Reinforcement Cords | Steel | Aramid | Aramid | Aramid | Aramid | Aramid | Aramid |
| Height hr/H (%) | 50 | 50 | 50 | 50 | 50 | 50 | 50 |
| Weight of tire (Index number) | 100 | 95 | 93 | 93 | 85 | 82 | 87 |
| Load durability (Index number) | 100 | 90 | 90 | 92 | 105 | 100 | 103 |
| Driveability (Index number) | 100 | 105 | 105 | 103 | 103 | 118 | 103 |

What is claimed is:

1. A pneumatic radial tire having an aspect ratio of 55% or less and a tire outer diameter of 720 mm or more, in which a carcass layer is disposed in the inner side of the tire to extend from a tread portion to left and right bead portions through sidewall portions, respectively, and a plurality of plies of belt layer are disposed on the outer circumferential side of the carcass layer, wherein
   the carcass layer is formed of a single ply,
   both ends of the carcass layer are folded back from the inner side of the tire to the outer side thereof around left and right bead cores, respectively, so as to wrap corresponding bead fillers,
   each end of the folded-back portions of the carcass layer is wrapped on the inner side of each end of the belt layer by not larger than 10% of a maximum width of the belt layer, and
   the hardness of the bead fillers is 65 to 80 in terms of JIS durometer A hardness, and the height hb thereof from a bead base is 10 to 20% of the cross-sectional height H of the tire,
   wherein a reinforcement layer composed of an organic fiber cord is disposed to extend in a tire radial direction along the bead core and the bead filler between a main body portion and each folded-back portion of the carcass layer; and
   a height hr of the reinforcement layer in a tire radial direction is 40 to 60% of the cross-sectional height H of the tire,
   wherein the reinforcement layer is wound so as to wrap the bead core and the bead filler.

2. The pneumatic radial tire according to claim 1, wherein the tire outer diameter is 720 mm or more but 765 mm or less.

3. The pneumatic radial tire according to claim 1, wherein the carcass layer is composed of a cord obtained by twisting three rayon fibers with a fineness of 1840 to 2200 dtex.

4. The pneumatic radial tire according to claim 1, wherein on the outer circumferential side of the belt layer, there is provided at least one ply of a belt cover layer of a full cover layer which is formed by winding a cord over the entire width of the belt layers continuously and helically in the tire circumferential direction in a density of 60 to 80 cords/50 mm, the cord being made of two organic fibers of 940 dtex or more but 1000 dtex or less twisted.

5. The pneumatic radial tire according to claim 4, wherein two plies of belt cover layer of the full cover layer are disposed.

6. The pneumatic radial tire according to any one of claims 4 and 5, wherein edge cover layers are provided on regions around both ends of the belt layer, each of the edge cover layers being formed by winding a cord in the tire circumferential direction continuously and helically at a pitch smaller than that of the belt cover layer of the full cover layer, the cord being made of two organic fibers of 940 dtex or more but 1000 dtex or less twisted.

7. The pneumatic radial tire according to claim 6, wherein the edge cover layer is disposed on a region which occupies the range extending by ±5 mm in the width direction from an intersection, as a center, at which a line, extending from the end of the folded-back portion of the carcass layer in the normal direction of the carcass layer, intersects a surface of the belt layer.

8. The pneumatic radial tire according to claim 1, wherein
   a tread pattern is provided in the tread surface in which a plurality of main grooves are disposed to extend in the tire circumferential direction in parallel on a center portion, and a plurality of lug grooves are disposed to extend in a tire width direction at a pitch in the tire circumferential direction on each of left and right shoulder portions; and
   the ratio of a groove area occupied by all the grooves in the tread surface is 28 to 33%, while the ratio of a groove area occupied by only the main grooves is 23 to 28%.

9. The pneumatic radial tire according to claim 8, wherein the tread pattern is asymmetric on the left and right sides with respect to a tire equator, and the lug grooves provided to the shoulder portion on the outer side of a vehicle when the tire is mounted on the vehicle is not communicated with the main grooves.

10. The pneumatic radial tire according to claim 1, wherein
   a tread pattern is provided in the tread surface in which a plurality of main grooves are disposed to extend in the tire circumferential direction in parallel on a center portion, and a plurality of lug grooves are disposed to extend in the tire width direction at a pitch in the tire circumferential direction on each of the left and right shoulder portions; and
   the depth of each main groove is 8.5 mm to 9.5 mm, while the depth of each lug groove is 30% to 50% of the depth of the main groove.

11. The pneumatic radial tire according to claim 1, wherein the pneumatic radial tire is a tire for SUV.

* * * * *